United States Patent [19]

Murata et al.

[11] Patent Number: 4,913,416
[45] Date of Patent: Apr. 3, 1990

[54] AUTOMATIC DOCUMENT TRANSPORTATION DEVICE

[75] Inventors: Mitsuhiro Murata, Nara; Naofumi Okada, Tenri; Kazutoshi Yamamoto, Nara; Takuharu Tanimoto; Tokuyasu Inoue, both of Hiroshima, all of Japan

[73] Assignee: Sharp Kabushiki Kaisha, Osaka, Japan

[21] Appl. No.: 368,067

[22] Filed: Jun. 15, 1989

Related U.S. Application Data

[63] Continuation of Ser. No. 160,183, Feb. 25, 1988, abandoned.

[30] Foreign Application Priority Data

Feb. 25, 1987 [JP] Japan .............................. 62-27573[U]

[51] Int. Cl.[4] ............................................ B65H 29/58
[52] U.S. Cl. ..................................... 271/186; 271/902
[58] Field of Search ................... 271/9, 902, 186, 291, 271/301; 355/318, 319, 320

[56] References Cited

U.S. PATENT DOCUMENTS

| 3,669,444 | 6/1972 | Van Namen | 271/902 X |
| 4,223,886 | 9/1980 | Vogt | 271/902 X |
| 4,345,751 | 8/1982 | Holzhauser | 271/3.1 |
| 4,456,236 | 6/1984 | Buddendeck | 271/291 X |
| 4,487,506 | 12/1984 | Repp | 355/319 X |

FOREIGN PATENT DOCUMENTS 22254 2/1983 Japan .................................. 271/902

Primary Examiner—Richard A. Schacher
Attorney, Agent, or Firm—Flehr, Hohbach, Test, Albritton & Herbert

[57] ABSTRACT

An automatic document transportation device has a rotatably supported guide piece at the junction between a document feeding route through which an incoming document sheet to be processed is passed to a scanning position and a discharge route through which the processed document sheet, moving backwards from the scanning position, travels to be discharged. The guide piece normally assumes a downward position by its own weight, thereby blocking the feeding route in such a way that the incoming document sheet can cause it to rotate and travel past it but the outgoing sheet, moving in the opposite direction, is deflected by it into the discharge route.

1 Claim, 5 Drawing Sheets

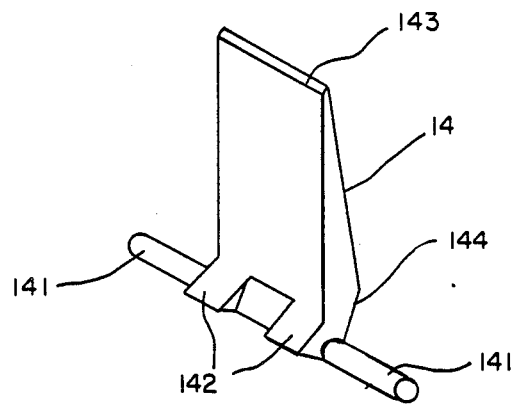
FIG.—5
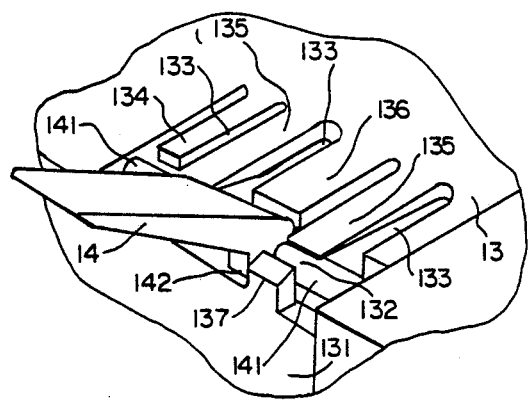
FIG.—6

AUTOMATIC DOCUMENT TRANSPORTATION DEVICE

This is a continuation of application Ser. No. 160,183, filed Feb. 25, 1988, now abandoned.

BACKGROUND OF THE INVENTION

This invention relates to an automatic document transportation device for a copier and the like for transporting an original document sheet to its scanning position to have its printed surface optically scanned and to a discharge location after it is scanned. More particularly, the present invention relates to a mechanism in such a device by which the motion of the sheet can be switched between a supply route for transporting it to the scanning position and a discharge route for removing it from the scanning position.

An automatic document transportation device is typically provided opposite to a document table (for example, of a transparent glass material) of a copier and serves to automatically transport an original to be copied onto the table and discharge it after it has been processed. In general, many document sheets are stacked on top of a document supply table and they are transported onto the table one sheet at a time in response to a control command from the copier. After each sheet is moved to the scanning position and optically scanned, it is discharged into a discharge tray and the next sheet on the supply table is transported onto the table.

An automatic document transportation device of the type described above is generally provided with a conveyor belt disposed opposite to the document table for transporting the document to the designated scanning position on the table. In order to bring the document sheet accurately to the scanning position, the driving force adapted to keep the belt traveling at a constant speed is switched off before the document sheet reaches the desired position (or before the front edge of the sheet reaches a stopper or the like) such that the belt travels an extra distance by inertia, causing the front edge of the sheet to gradually come into contact with the stopper. After the document sheet thus brought to the desired scanning position is scanned and is about to be discharged into the discharge tray, a solenoid or the like is activated to move the stopper from its earlier position such that the front edge of the sheet is no longer stopped thereby and that the sheet can be moved again towards the discharge tray.

Japanese Patent Publication Tokkai No. 60-19134 has disclosed, by contrast, a different kind of automatic document transportation device which, after a document sheet is scanned at the scanning position, transports the processed sheet backward in the direction from which it has been brought in. The path from the supply position to the scanning position and the path therefrom to the discharge tray are switched from one to the other by changing the position of a guide piece.

With a conventional automatic document transportation device of either type described above, a solenoid or the like is required to drive the stopper or the guide piece to select a transportation route. This has the disadvantage of making the circuit more complicated.

SUMMARY OF THE INVENTION

It is therefore an object of the present invention to provide an automatic document transportation device which does not require a stopper or a solenoid which drives it.

An automatic document transportation device according to the present invention, with which the above and other objects of the present invention are achieved, is provided with a guide piece which, by changing its angular position, can selectively form a document supply route from the document supply position to the scanning position on the table and a document discharge route from the scanning position to the discharge tray. This route-switching guide piece is disposed at the junction of these two routes and rotatably supported such that it tends to point in a downward direction by its own weight and that it will naturally turn in the direction of transporting a document sheet to the scanning position.

BRIEF DESCRIPTION OF THE DRAWINGS

The accompanying drawings which are incorporated in and form a part of the specification, illustrate an embodiment of the present invention and, together with the description, serve to explain the principles of the invention. In the drawings:

FIG. 5 is an external diagonal view to show the structure of the switching guide piece, and FIG. 6 is a diagonal view showing the positioning of the switching guide piece.

DETAILED DESCRIPTION OF THE INVENTION

Figure 1:
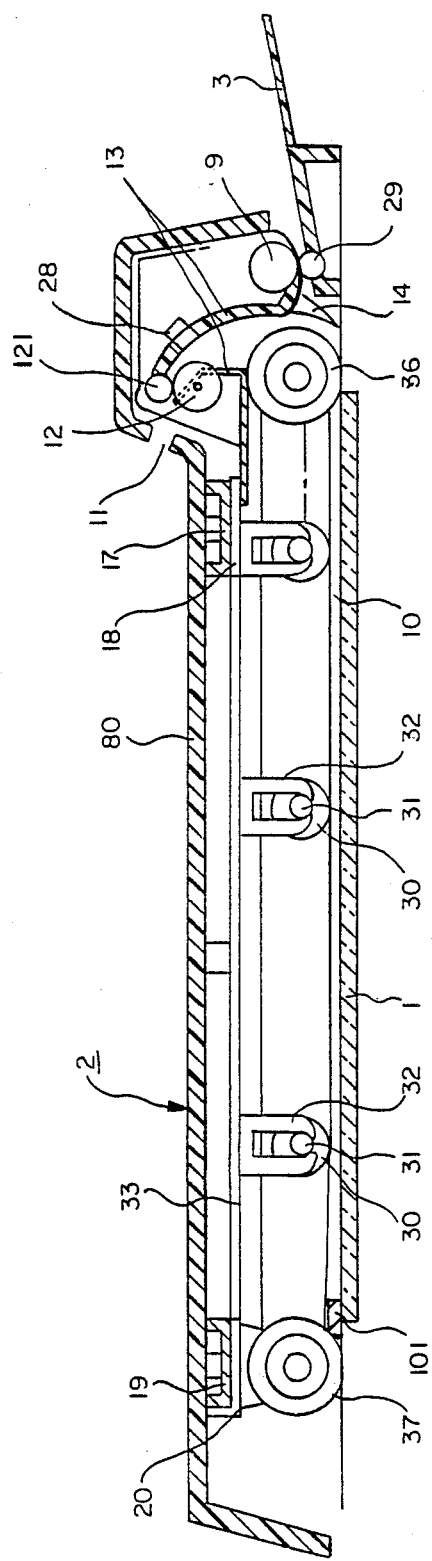
FIG. 1 is a sectional view showing the overall structure of an automatic document transportation device embodying the present invention.
Figure 2:
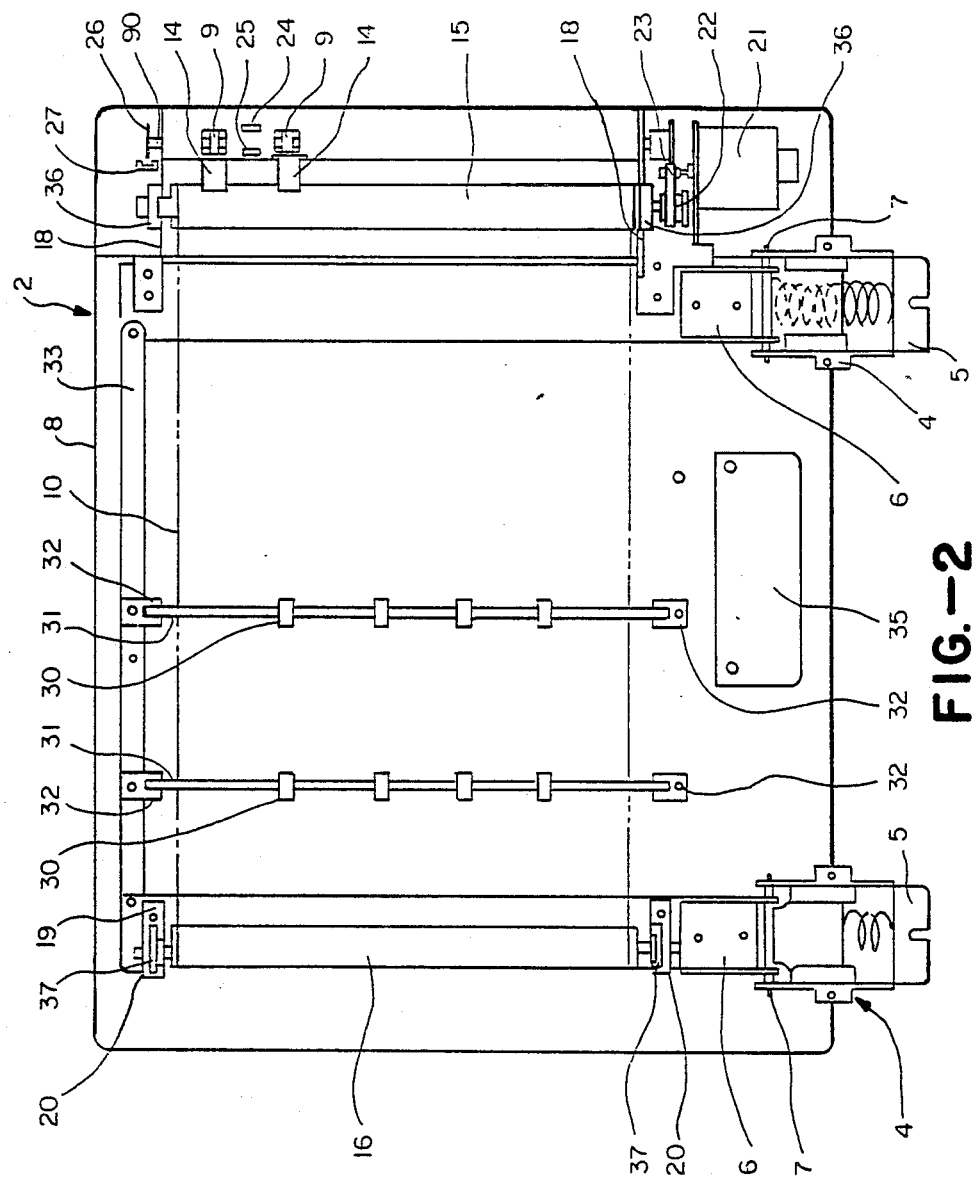
FIG. 2 is a plan view of the document transportation device of FIG. 1 seen from inside when it is opened with respect to the housing of a copier of which it is a part.

With reference to FIGS. 1 and 2 illustrating an automatic document transportation device embodying the present invention, numeral 1 indicates a document table made of a transparent glass which is provided at the top part of the housing of a copier and is adapted to have a document sheet to be placed thereon, numeral 2 indicates a main body of the document transporting device which can be opened and closed with respect to the document table 1, and numeral 3 indicates a document supply table on which document sheets are stacked and from which the staked document sheets are fed to the document transportation device one sheet at a time. This document supply table 3 is affixed to an elevated part of the copier housing and is not adapted to open or close with the main body 2 of the document transportation device. A stopper 101 is provided at one end of the document table 1 to limit the motion of an incoming document sheet, serving as a reference position for its front edge.

Hinge mechanisms 4 are provided on a side edge of the main body 2 such that parts 5 which are fastened to the copier and parts 6 which are fastened to the main body 2 of the document transportation device are connected rotatably with respect to each other around axes 7 such that the document transportation device can be opened and closed around these axes 7. The main body 2 further contains within its outer housing piece 8 document feeding rollers 9, an endless conveyor belt 10 for transporting document sheets one at a time onto the table 1, discharge rollers 12 and 121 for discharging a document sheet through a discharge outlet 11 onto a discharge tray 80 formed on top of the housing piece 8, a discharge guide piece 13 for leading the document sheet to these discharge rollers 12 and 121 and route-switching guide pieces 14 for directing the document sheet towards the discharge guide piece 13 when the document sheet is intended to be discharged. The outlet 11 is formed by removing a portion of the housing piece 8.

The conveyor belt 10 is stretched between conveyor rollers 15 and 16 disposed opposite to edge parts of the document table 1 and is driven by the roller 15. The driving roller 15 is supported rotatably through bearings by frames 18 each affixed at one end to a supporting plate 17 attached directly to the housing piece 8. Similarly, the other conveyor roller 16 is supported rotatably through bearings by supporting members 20 affixed to another supporting plate 19 attached directly to the housing piece 8 parallel to the aforementioned supporting plate 17. One end of the axis of the driving roller 15 penetrates the frame 18 which supports it and is connected to a pulley 22 through which the motive force of a motor (such as a DC motor) 21 is communicated. A driving belt 23 is stretched between a driver pulley on the shaft of this motor 21 and the aforementioned pulley 22 to communicate the rotary power of the motor 21 to the driving roller 15.

The aforementioned frames 18 also support the discharge roller 12 rotatably through bearings or the like, and the rotary power of the motor 21 is also communicated to the other discharge roller 121. They are so adjusted that a document sheet is discharged by the discharge rollers 12 and 121 at nearly the same speed as the speed at which it is transported by the conveyor belt 10. In addition to the discharge roller 12, the axes of the document feeding rollers 9, the discharge guide piece 13, etc. are also attached to the frames 18 to form a single unit. The document feeding rollers 9 are driven independently of the conveyer belt 10, having a separate motor (not shown) such as a DC motor provided to communicate its rotary power to their axes.

Near the document supplying rollers 9 and sandwiched therebetween are document detectors 24 and 25 for detecting a document moving from the document supply table 3. These detectors 24 and 25 may be optical sensors comprised of a light emitting element and a light receiving element. When the first document detector 24 detects the front edge of an incoming document, the document feeding rollers 9 are driven to send the document to the conveyer belt 10. When the second document detector 25 detects the document being thus transported, the feeding rollers 9 are stopped and the document is caused to temporarily wait at this position. The feeding rollers 9 have a shaft 90 with one end protruding from the frame 18 which supports it. Attached to this protruding end of the shaft 90 is a clock disk 26 with slits formed at equal intervals for detecting the length of the document. An optical sensor 27 with a light emitting element and a light receiving element sandwiches this clock disk 26 and measures the length of the document which moves past the document feeding rollers 9 by counting the slit signal (clock pulse) outputted from this optical sensor.

The guide pieces 14 are provided between the document feeding rollers 9 and the conveyer belt 10 in the path of the incoming document sheet pointing in the direction of its motion towards the conveyer belt 10. Described more in detail, these pieces 14 are at the junction between the document supply route through which a document sheet is transported past the document feeding rollers 9 and by the conveyer belt 10 until it reaches the scanning position and its front edge comes into contact with the stopper 101 and the discharge route through which a document sheet at the scanning position is discharge by the conveyer belt 10 and the discharge roller 12 and 121.

Figure 3:
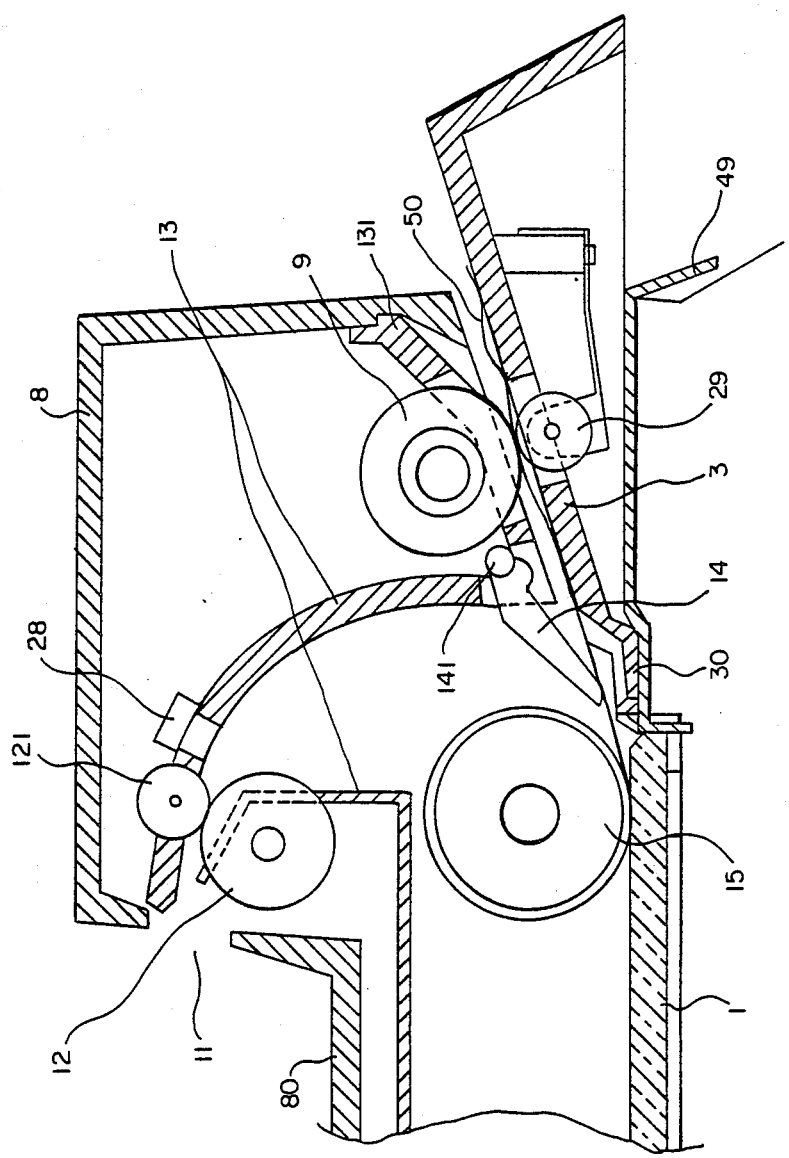
FIGS. 3 and 4 are sectional views of a portion of the document transportation device of FIG. 1 to show the operation of the switching guide piece.
Figure 4:
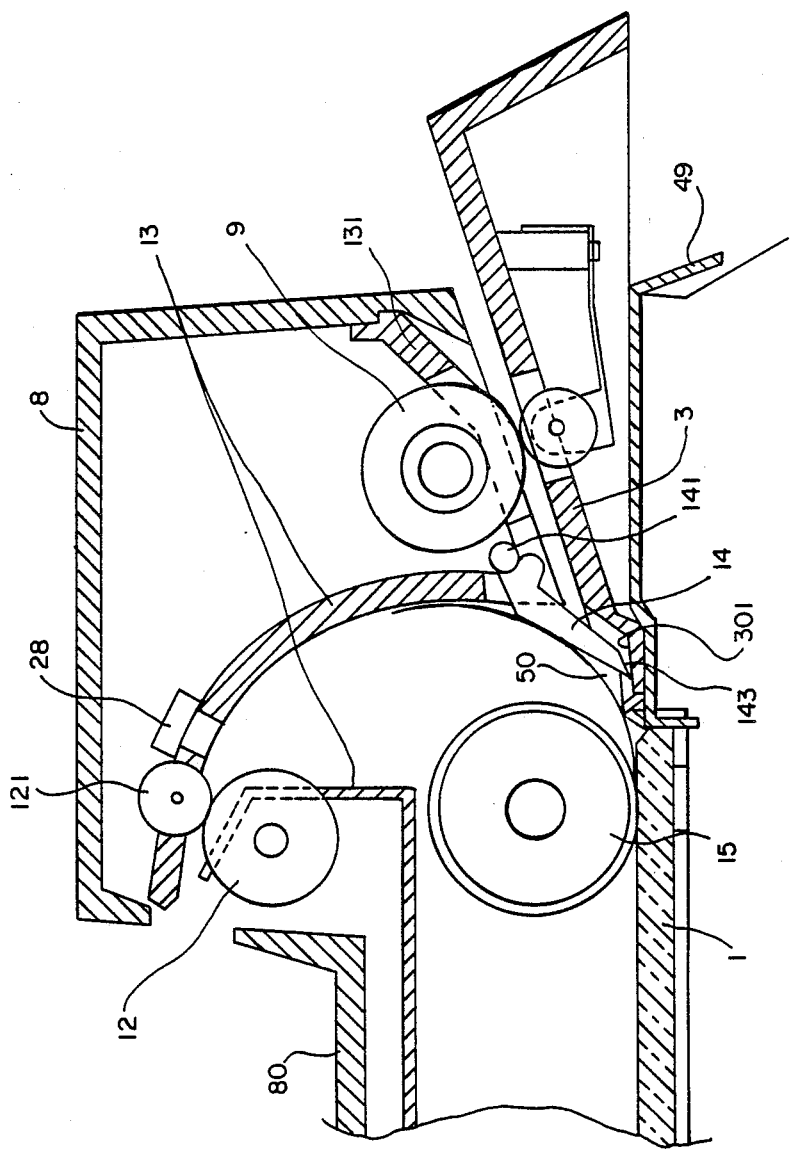

As shown more clearly in FIGS. 3, 4 and 5, the switching guide pieces 14 are provided with a shaft 141 which is rotatably supported at the junction of the aforementioned two document routes so as to be able to rotate unistructurally with the pieces 14. In other words, the switching guide pieces 14 are near the junction of the discharge guide piece 13 and a document supply guide piece 131 for directing document sheets from the document supply table 3. Protrusions 142 are also unistructurally formed with the switching guide pieces 14 for limiting the motion thereof around the shaft 141. The edge parts 143 of the switching guide pieces 14 farthest from the shaft 141 are cut at such an angle as to make it easier to guide a processed document 50 into the discharge route towards the discharge rollers 12 and 121 through the discharge route as shown in FIG. 4.

As shown in FIG. 6, the shaft 141 of the switching guide pieces 14 is inserted into an opening 132 formed by removing portions of the joint between the discharge guide piece 13 and the supply guide piece 131. The end part of the discharge guide piece 13 adjacent to this opening 132 is provided with several notches 133 which form protruding pieces 134, 135 and 136 therebetween. The pieces 134 are for supporting the shaft 141 and are provided with an arcuate contact surface (not shown) for supporting the shaft 141 thereon. The pieces 135 serve to prevent the shaft 141 from falling off from its intended position. The piece 136 serves to restrict the rotary motion of the shaft 141 as will be explained below. The supply guide piece 131 is correspondingly provided with protrusions 137 opposite to the holding pieces 135 to rotatably support the shaft 141. The edges of the protrusion 137 and the piece 135 are separated by a distance about one-half of the diameter of the shaft 141. The pieces 135 are thinner towards their edges as shown in FIG. 6 such that the shaft 141 can be inserted easily into the opening 132. If the shaft 141 is pressed against the pieces 135 so as to bend them, the shaft 141 is inserted easily into the opening 132 and is rotatably supported therein by the pieces 134 and 137 and prevented from falling off by the pieces 135.

Since the shaft 141 is thus supported rotatably, it naturally tends to rotate such that the switching guide pieces 14 unistructurally formed therewith hang therefrom by their own weight until the protrusions 142 come into contact with the supply guide piece 131. Their motion in the opposite direction against their weight is limited by the piece 136 of the discharge guide piece 13 which comes into contact with the upper surface 144 of the switching guide piece 14. FIG. 4 shows the shaft 141 so rotated by the gravitational force that the switching guide pieces 14 are in their lowest position and in contact with the document supply table 3 where an indentation 301 is formed to accept the edges of the switching guide pieces 14. The document supply table 3 is made higher than the upper surface of the document table 1 and is affixed above the outer housing piece 49 of the copier main body.

The switching guide pieces 14 are so designed that they can be moved in the clockwise direction with respect to FIGS. 3 and 4 by a document sheet transported from the document supply table 3 by the document feeding rollers 9. Thus, the incoming document sheet 50 can pass under the pieces 14 to the document table 1 as shown in FIG. 3. When the document sheet 50 is transported backwards on the document table 1 after it is processed, however, its front edge is deflected as shown in FIG. 4 into the discharge route defined by the discharge guide piece 13 because there is no opening between the tips of the switching guide pieces 14 and the document supply table 3. A detector 28 similar to those (24 and 25) between the document feeding rollers 9 is provided in the discharge route near the discharge roller 12. When a processed document to be discharged is detected by this detector, a detection signal is transmitted to a control circuit (not shown) which thereupon drives the discharge roller 12 according to the length of the document sheet measured earlier. For example, the discharge roller 12 may be decelerated when the back edge of the document sheet is about 40 mm from the position of the discharge roller 12 and the driving force therefore may be switched off when the back edge is about 10 mm from the discharge roller 12.

The roller 15 for driving the conveyer belt 10, the document feeding rollers 9, the document discharge roller 12, the discharge guide piece 13, the document supply guide piece 131, the switching guide pieces 14, the motor 21 and the detectors 24, 25 and 28 are unistructurally formed and attached to the fames 18. A contact roller 29 in contact with the document feeding rollers 9 is rotatably supported by the document supply table 3. As shown in FIG. 1, auxiliary rollers 30 are disposed at appropriate intervals inside the belt 10 such that the document sheet can be transported on the document table 1 effectively without slipping. The ends of the shafts 31 of the auxiliary rollers 30 are supported by supporting members 32 such that the shafts 31 are not only rotatable but also movable vertically. When the automatic document transportation device is closed as shown in FIG. 1, therefore, the rollers 30 move downward by gravity and press the conveyer belt 10 downward against the surface of the document table 1. As shown in FIG. 2, the supporting members 32 on one side of the shafts 31 are affixed to a stay 33 connecting the supporting plates 17 and 19 and those on the other side are directly affixed to the housing piece 8. In FIG. 2, numeral 35 indicates a base board for the control circuit for controlling the overall operation of the document transportation device, operating the motor 21 in response to a command signal from the copier main body, for example, and outputting a signal back to the copier main body. Numerals 36 and 37 indicate collars which are affixed to the axes of the rollers 15 and 16, respectively, to keep a fixed distance between the conveyer belt 10 and the document table 1.

Operation of the automatic document transportation device thus structured and the motion of a document sheet therethrough are explained next in detail. When a document sheet to be copied is inserted along the document supply table 3 and its front edge is detected by the detector 24, the document feeding rollers 9 are activated and the document sheet is transported between the document feeding rollers 9 and the contact rollers 29 in contact therewith. When the document sheet is thereafter detected by the next detector 25, the motive force on the feeding rollers 9 is switched off and the sheet waits at this position. When a signal indicative of the wait condition of the document sheet is transmitted to the main body of the copier, the copier begins to get ready for a copying operation. If a copy switch on the main body or a start switch on the document transportation device is operated thereafter, a command signal is transmitted from the copier main body to start the transportation of the document sheet, causing the document feeding rollers 9 and the conyeyer belt 10 to start moving simultaneously by activating the motor (not shown) for driving the document feeding rollers 9 and the motor 21 for driving the conveyer belt 10. When the document sheet in the wait condition is thereby transported along the document feeding route formed between the document supply guide piece 131 and the document supply table 3 and its front edge reaches the position of the switching guide pieces 14, the force with which the document sheet is being pushed through the feeding route causes the pieces 14 to rotate around their shaft 141 so as to allow the sheet to pass thereunder. In other words, the pieces 14 rotate in the clockwise direction with reference to FIGS. 3 and 4 and do not prevent the incoming document sheet from reaching the other side. The sheet is thus directed to the conveyer belt 10.

While the document sheet is thus transported, its length is measured by counting the clock signal generated by the clock disk 26 attached to the shaft 90 of the feeding rollers 9 until the back edge of the sheet passes the position of the detector 24. The number thus counted is multiplied by the distance traveled by the document sheet during one pulse period and the distance between the detectors 24 and 25 is added to this product to obtain the desired length. The measured length is temporarily stored in a memory device (not shown) on the base board 35 of the control circuit. When the back edge of the incoming document sheet is detected by the detector 25, the force driving the document feeding rollers 9 is switched off and the document sheet is thereafter transported on the document table 1 by the conveyer belt 10. In the meantime, the document feeding rollers 9 get ready to bring the next sheet into the aforementioned wait condition.

The conveyer belt 10 is adapted to transport a document sheet at a speed, for example, of about 800–1000 mm/sec. When the front edge of the sheet being transported by the conveyer belt 10 comes within about 60 mm of the stopper 101, the output to the motor 21 is lowered and the speed of the conveyer belt 10 is reduced to about $\frac{1}{2}-\frac{1}{4}$ (or about 300 mm/sec). The speed of the conveyer belt 10 should be reduced as much as possible but the load for its operation increases and it may become impossible to accurately control the speed of the motor 21. After the front edge of the document sheet touches the stopper 101, the motor 21 is run for an extra period of time sufficient for moving the conveyer belt 10 by about 10 mm. This is done in part for the purpose of correcting the orientation of the document sheet which may have become disoriented and in part in view of the possibility that the front edge of the document sheet failed to reach the stopper 101 because of the inertial forces of various components. After the document sheet is thus correctly transported to the designated scanning position, a signal indicative of its correct positioning is transmitted to the copier main body and the standard copying operation is started.

After a desired number of copies are made, or after the optical scanning of the document sheet is completed, a command signal is transmitted to the transportation device 2 to discharge the document sheet on the document table 1. The motor 21 is thereupon rotated in the reverse direction and the document sheet is moved backward, what was its back edge now becoming its front edge. The speed of this backward motion is set to be about the same as that of the forward motion of the sheet to the scanning position.

When the new front edge of the document sheet being moved backward reaches the position of the switching guide pieces 14, its continued backward motion to the document feeding rollers 9 is obstructed and the sheet is deflected into the document discharge route formed by the discharge guide piece 13. In other words, the switching guide pieces 14 cannot be moved in the counter-clockwise direction from the position shown in FIG. 4 when the front edge of the backward moving document sheet strikes them. It should be noted that the switching guide pieces 14 have come to assume this position shown in FIG. 4 by their own weight and no control circuit or solenoid for this purpose is required. Since the tips of the switching guide pieces 14 are received into the indentation 301 formed on the document supply table 3, the backward moving document sheet does not get stuck under the guide pieces 14.

The document sheet deflected into the discharge route is sandwiched between the discharge rollers 12 and 121 and discharged onto the discharge tray 80 formed above the outer housing piece 8. As the sheet moving in the discharge route is detected by the detector 28, the speed of its motion controlled by the discharge rollers 12 and 121 is reduced to ½-¼ (about 40 mm) before the back edge of the sheet passes the position of the detector 28. The measured length of the sheet stored in the memory device is used for this control. The motor 22 is temporarily stopped, for example, for about 100 msec when the edge of the sheet comes within about 10 mm of the detector 28, causing the discharge rollers 12 and 121 to stop and hence the sheet sandwiched therebetween to also stop temporarily. After this short period of time, the operation of the motor 21 is restarted and the discharge of the document sheet is resumed at about ½-¼ of the normal speed. Since the front edge of the sheet being discharged drops by it own weight when the sheet is temporarily stopped while being sandwiched between the discharge rollers 12 and 121, and since the sheet is transported onto the discharge tray 80 at a reduced speed, the sheet being discharged is not scattered uncontrollably but the discharge operation can be accomplished efficiently and in an orderly manner.

In summary, an automatic document transportation device of the present invention is characterized as having route-switching guide pieces which are rotatable but normally assume a downward position by their own weight such that an incoming document sheet can push them open to advance in a forward direction but an outgoing sheet is deflected by them into the discharge route. As a result, there is no need for a solenoid or a control circuit to switch the routes for the document sheet.

The foregoing description of a preferred embodiment of the invention has been presented for purposes of illustration and description. It is not intended to be exhaustive or to limit the invention to the precise form disclosed. For example, the materials of which various component parts are made need not be exactly as described and/or illustrated. Any modifications and variations that may be apparent to a person skilled in the art are intended to be included within the scope of this invention.

What is claimed is:

1. An automatic document transportation device comprising
    a generally stationary first structure having a top surface,
    a second structure containing document moving means,
    a hinge means attached to both said first and second structures for allowing said second structure to open and close by rotating said second structure with respect to said first structure to thereby assume an open position and a closed position,
    a document feeding route which is formed between said first and second structures and through which a document sheet is transported in an incoming direction to a scanning position defined on said top surface,
    a discharge route through which a scanned document sheet is transported to be discharged in an outgoing direction which is in part opposite said incoming direction, said feeding route and said discharge route being connected to form a junction,
    switching means for switching between said feeding route and said discharge route, said switching means including a guide piece which is rotatably supported by said second structure at said junction, said guide piece being freely rotatable to allow a document sheet to pass through said feeding route in said incoming direction when said document sheet is transported to said scanning position, said guide piece being prevented from rotating to allow a scanned document sheet moving in said outgoing direction to pass from said scanning position into said feeding route and causing said scanned document sheet to be transported through said discharge route when said scanned document sheet is transported in said outgoing direction from said scanning position, said table top having an indentation formed thereon at said junction such that a free edge of said guide piece falls into said indentation when said second structure assumes said closed position with respect to said first structure.

* * * * *